United States Patent
Liu et al.

(10) Patent No.: US 11,521,122 B2
(45) Date of Patent: Dec. 6, 2022

(54) AUTOMATED SEISMIC INTERPRETATION SYSTEMS AND METHODS FOR CONTINUAL LEARNING AND INFERENCE OF GEOLOGICAL FEATURES

(71) Applicant: ExxonMobil Upstream Research Company, Spring, TX (US)

(72) Inventors: Wei D. Liu, Schenectady, NY (US); Huseyin Denli, Basking Ridge, NJ (US); Kuang-Hung Liu, Basking Ridge, NJ (US); Michael H. Kovalski, Summit, NJ (US); Victoria M. Som De Cerff, Jersey City, NJ (US); Cody J. MacDonald, Houston, TX (US); Diego A. Hernandez, Tomball, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 529 days.

(21) Appl. No.: 16/685,692

(22) Filed: Nov. 15, 2019

(65) Prior Publication Data
US 2020/0184374 A1  Jun. 11, 2020

Related U.S. Application Data

(60) Provisional application No. 62/849,574, filed on May 17, 2019, provisional application No. 62/777,941, filed on Dec. 11, 2018.

(51) Int. Cl.
*G06F 16/22* (2019.01)
*G06N 20/00* (2019.01)
(Continued)

(52) U.S. Cl.
CPC ............. *G06N 20/00* (2019.01); *G01V 1/282* (2013.01); *G01V 1/301* (2013.01);
(Continued)

(58) Field of Classification Search
CPC ........ G06N 3/08; G06N 3/0454; G06N 7/005; G06N 20/00; G01V 99/005; G01V 1/301;
(Continued)

(56) References Cited

U.S. PATENT DOCUMENTS 5,444,619 A   8/1995  Hoskins et al.
5,940,777 A   8/1999  Keskes
(Continued)

FOREIGN PATENT DOCUMENTS

CA   2873816 A1 * 12/2013   ............... G01V 5/06
EP   0 561 492 B1   1/1998
(Continued)

OTHER PUBLICATIONS

Yingling Guo et al., Fault and horizon automatic interpretation by CNN: a casestudy of coalfield, Oct. 28, 2020, Journal of Geophysics and Engineering, 0, pp. 1-10 (Year: 2020).*

(Continued)

*Primary Examiner* — Mischita L Henson
(74) *Attorney, Agent, or Firm* — Lempia Summerfield Katz LLC

(57) ABSTRACT

A method and apparatus for automated seismic interpretation (ASI), including: obtaining trained models comprising a geologic scenario from a model repository, wherein the trained models comprise executable code; obtaining test data comprising geophysical data for a subsurface region; and performing an inference on the test data with the trained models to generate a feature probability map representative of subsurface features. A method and apparatus for machine learning, including: an ASI model; a training dataset comprising seismic images and a plurality of data portions; a plurality of memory locations, each comprising a replication of the ASI model and a different data portion of the training dataset; a plurality of data augmentation modules, each (Continued)

identified with one of the plurality of memory locations; a training module configured to receive output from the plurality of data augmentation modules; and a model repository configured to receive updated models from the training module.

27 Claims, 7 Drawing Sheets

(51) Int. Cl.
    *G01V 1/28*     (2006.01)
    *G01V 1/30*     (2006.01)
    *G06K 9/62*     (2022.01)
    *G06N 7/00*     (2006.01)

(52) U.S. Cl.
    CPC ....... *G06F 16/2246* (2019.01); *G06K 9/6256* (2013.01); *G06N 7/005* (2013.01)

(58) Field of Classification Search
    CPC ...... G01V 2210/66; G01V 1/28; G06F 30/27; G06K 9/6256; G06T 2207/20081; G06T 2207/20084
    See application file for complete search history.

(56) References Cited

U.S. PATENT DOCUMENTS

| | | |
|---|---|---|
| 6,374,185 B1 | 4/2002 | Taner et al. |
| 6,438,493 B1 | 8/2002 | West et al. |
| 6,662,112 B2 | 12/2003 | Eastwood et al. |
| 6,735,526 B1 | 5/2004 | Meldahl et al. |
| 7,844,402 B2 | 11/2010 | Klein et al. |
| 8,055,026 B2 | 11/2011 | Pedersen |
| 9,366,772 B2 | 6/2016 | Imhof |
| 9,489,769 B2 | 11/2016 | Luneburg et al. |
| 9,618,839 B2 | 4/2017 | Witte et al. |
| 11,079,509 B1* | 8/2021 | Tertois ................... G01V 1/325 |
| 2015/0234070 A1 | 8/2015 | Xu et al. |
| 2017/0364795 A1 | 12/2017 | Anderson et al. |
| 2018/0106917 A1 | 4/2018 | Osypov et al. |
| 2018/0120461 A1 | 5/2018 | Allegar et al. |
| 2018/0306940 A1 | 10/2018 | Basler-Reeder et al. |
| 2019/0064378 A1 | 2/2019 | Liu et al. |
| 2019/0162868 A1* | 5/2019 | Salman ..................... G01V 1/52 |
| 2019/0169962 A1 | 6/2019 | Aqrawi et al. |
| 2019/0250204 A1 | 8/2019 | Salman |
| 2019/0383985 A1 | 12/2019 | Salman et al. |
| 2019/0391205 A1 | 12/2019 | Salman et al. |
| 2020/0183047 A1* | 6/2020 | Denli ...................... G06F 17/18 |

FOREIGN PATENT DOCUMENTS

| | | |
|---|---|---|
| WO | 9928767 A1 | 6/1999 |
| WO | WO 2017/188858 A1 | 11/2017 |

OTHER PUBLICATIONS

Kai Goa et al., Automatic fault detection on seismic images using a multiscale attention convolutional neural network (Abstract only), Geophysics, 87 (1), pp. N13-N29 (Year: 2022).*
Akcelik et al. (2011) "Multiparameter Material Model and Source Signature Full Waveform Inversion," *SEG San Antonio 2011 Annual Meeting*, pp. 2406-2410.
Andersson et al. (2004) "T-H-M-C Modelling of Rock Mass Behaviour—1: The Purposes, The Procedures and the Products", *Geo-Engineering*, pp. 433-438.
Araya-Polo et al. (2017) "Automated fault detection without seismic processing," *The Leading Edge*, vol. 36, pp. 208-214.
Arovsky et al. (2017) "Wasserstein GAN", pp. 1-32.
Aster et al. (2013) "Tikhonov Regularization", *Parameter Estimation and Inverse Problems*, pp. 93-127.
Baan et al. (2000) "Neural networks in geophysical applications", *Geophysics*, vol. 65, No. 4, pp. 1032-1047.
Backus et al. (1967) "Numerical applications of a formalism for geophysical inverse problems", *Geophysical Journal of the Royal Astronomical Society*, vol. 13, pp. 247-276.
Bellemare et al. (2017) "The Cramer Distance as a Solution to Biased Wasserstein Gradients", pp. 1-20.
Chau et al. (2017) "Parametrization and the Generation of Geological Models with Generative Adversarial Networks", pp. 1-28.
Chave et al. (2012) "Introduction to the magnetotelluric method", *The magnetoelluric method: theory and practice*, Cambridge University Press, pp. 1-18.
Chers et al. (2016) "InfoGAN: Interpretable Representation Learning by Information Maximizing Generative Adversarial Nets", *30th Conference on Neural Information Processing Systems*, pp. 1-9.
Cubuk et al. (2018) "AutoAugment: Learning Augmentation Policies from Data", pp. 1-14.
Denli et al. (2013) "Full-Wavefield Inversion for Acoustic Wave Velocity and Attenuation," *SEG Houston 2013 Annual Meeting*, pp. 980-985.
Duchi et al. (2011) "Adaptive subgradient methods for online learning and stochastic optimization", *Journal of Machine Learning Research*, vol. 12, pp. 2121-2159.
Etgen et al. (2009) "An overview of depth imaging in exploration geophysics", *Geophysics*, Vo.74, pp. WCA5-WCA17.
Etgen et al. (2010) "Introduction to this special section: Reverse time migration" *The Leading Edge*, vol. 29, p. 1363.
Fedus et al. (2018) "Many Paths to Equilibrium: GANs Do Not Need to Decrease a Divergence at Every Step", *International Conference on Learning Representation*, pp. 1-21.
Gibson et al. (2003) "Automatic Fault Detection for 3D Seismic Data," *DICTA* pp. 821-830.
Goodfellow et al. (2014) "Generative Adversarial Nets," *Advances in Neural Information Processing Systems 27, NIPS*, pp. 1-9.
Guillen et al. (2015) "Supervised learning to detect salt body", *SEG New Orleans 2015 Annual Meeting*, pp. 1826-1829.
Gulrajani et al. (2017) "Improved Training of Wasserstein GANs" *CoRR*, pp. 1-11.
Dave Hale (2013) "Methods to compute fault images, extract fault surfaces, and estimate fault throws from 3D seismic images", *Geophysics*, vol. 78, pp. O33-O43.
Hami-Eddine et al. (2012) "Anomaly Detection using dynamic Neural Networks, classification of prestack data", *SEG Las Vegas 2012 Annual Meeting*, pp. 1-5.
Hami-Eddine et al. (2015) "A new technique for lithology and fluid content prediction from prestack data: An application to a carbonate reservoir", Interpretation, vol. 3, No. 1, pp. S19-S32.
He et al. (2016) "Deep Residual Learning for Image Recognition," *2016 IEEE Conference on Computer Vision and Pattern Recognition (CVPR)*, pp. 770-778.
Hesthaven et al. (2007), "Nodal Discontinuous Galerkin Methods: Algorithms, Analysis, and Applications", *Springer, Texts in Applied Mathematics*, pp. 19-41.
Huang et al. (2017) "A scalable deep learning platform for identifying geologic features from seismic attributes", *The Leading Edge*, vol. 36, pp. 249-256.
Isola et al. (2018) "Image-to-Image Translation with Conditional Adversarial Networks", *2017 IEEE Conference on Computer Vision and Pattern Recognition*, pp. 5967-5976.
Janoos et al. (2014) "Multi-scale graphical models for spatio-temporal processes", *Advances in Neural Information Processing Systems*, vol. 27, pp. 316-324.
Jiang et al. (2016) "Detecting prospective structures in volumetric geo-seismic data using deep convolutional neural networks," Poster presented at the annual foundation council meeting of the Bonn-Aachen International Center for Information Technology (b-it), p. 1.
Ying Jiang (2017) "Detecting Geological Structures in Seismic vols. Using Deep Convolutional Neural Networks", *Master Thesis from Rheinish-Westfalische Hochschule Aachen*, p. 1-76.
Kingma et al. (2015) "Adam: A Method for Stochastic Optimization," *ICLR—Conference Paper*, pp. 1-15.

(56) References Cited

OTHER PUBLICATIONS

Koenderink et al. (1994) "Two-plus-one-Dimensional differential geometry," *Pattern Recognition Letters*, vol. 15, pp. 439-443.
Komatitsch et al. (2000) "The spectral element method for three-dimensional seismic wave propagation" *SEG Technical Program Expanded Abstracts*, pp. 2197-2200.
Krizhevsky et al. (2012) "ImageNet classification with deep convolution neural networks", *NIPS*, pp. 1-9.
LeCun, Y. (2015) "Deep Learning," *Nature*, vol. 521, pp. 436-444.
Lewis et al. (2017) "Deep learning prior models from seismic images for full-waveform inversion", *SEG Technical Program Expanded Abstracts*, pp. 1512-1517.
Leveque, R. J. (2002) "Finite vol. methods for hyperbolic problems", Cambridge Texts in Applied Mathematics, Cambridge University Press, pp. 64-85.
Li et al. (2015) "Gravity and magnetic methods in mineral and oil & gas exploration and production", *EAGE*, pp. 15-24.
Lin et al. (2013) "A wavelet-based model compression method for three-dimensional electromagnetic data inversion", *SEG Houston 2013 Annual Meeting*, pp. 707-712.
Lin et al. (2017) "Building Subsurface Velocity Models with Sharp Interfaces Using Interface-Guided Seismic Full-Waveform Inversion", *Proceedings: Thirty-Ninth Workshop on Geothermal Reservoir Engineering*, pp. 1-8.
Lines et al. (2004) "Fundamentals of Geophysical Interpretation", Chapter 15, Geophysical Monograph Series, Society of Exploration Geophysicists, pp. 137-144.
Lines et al. (2004) "Fundamentals of Geophysical Interpretation", Chapter 16, Geophysical Monograph Series, Society of Exploration Geophysicists, pp. 145-158.
Lines et al. (2004) "Fundamentals of Geophysical Interpretation", Chapter 17, Geophysical Monograph Series, Society of Exploration Geophysicists, pp. 159-170.
Lines et al. (2004) "Fundamentals of Geophysical Interpretation", Chapter 18, Geophysical Monograph Series, Society of Exploration Geophysicists, pp. 171-180.
Long et al. (2015) "Fully Convolutional Networks for Semantic Segmentation," *Proceedings of the IEEE Computer Society Conference on Computer Vision and Pattern Recognition*, pp. 3431-3440.
Ma et al. (2012) "Image-guided sparse-model full waveform inversion", *Geophysics*, vol. 77, pp. R189-R198.
Macias et al. (2000) "Artificial neural networks for parameter estimation in geophysics", *Geophysical Prospecting*, vol. 48, pp. 21-47.
Marroquin et al. (2009) "A visual data-mining methodology for seismic facies analysis: Part 1—testing and comparison with other unsupervised clustering methods", *Geophysics*, vol. 74, pp. P1-P11.
Miller et al. (2001) "Seismic interpretation and processing applications", *Handbook of Geophysical Exploration*, pp. 101-118.
Moczo et al. (2007) "The finite-difference time-domain method for modeling of seismic wave propagation", *Advances in Geophysics*, vol. 48, pp. 421-516.
Mun et al. (2017) "Comparison of objective functions in CNN-based prostate magnetic resonance image segmentation", *2017 IEEE International Conference on Image Processing (ICIIP)*, pp. 3859-3863.
Nocedal et al. (2006) "Numerical optimization", *Springer Series in Operations Research and Financial Engineering*, pp. 10-29.
D. Oldenburg (1990) "Inversion of electromagnetic data: An overview of new techniques", *Surveys in Geophysics*, vol. 11 pp. 231-270.
PaleoScan Software available from Eliis, http://www.eliis.fr/products/paleoscan-software, downloaded Jul. 3, 2018, p. 1-2.
G. Partyka, (2017) "Seismic processing and analysis in service of interpretation", *SEG Technical Program Expanded Abstracts*, pp. 5261-5266.
Regone et al. (2017) "Geologic model building in SEAM Phase II—Land seismic challenges", *The Leading Edge*, pp. 738-749.
Ronneberger et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.
Roth et al. (1994), "Neural networks and inversion of seismic data", *Journal of Geophysical Research*, vol. 99, pp. 6753-6768.
Sava et al. (2009), "Overview and classification of wavefield seismic imaging methods" *The Leading Edge*, vol. 28, pp. 170-183.
Schaefer et al. (2006) "Image deformation using moving least squares", *ACM Transactions on Graphics* vol. 25, pp. 533-540.
Schiesser (1991) "A PDE Second-Order in Time: The Hyperbolic Wave Equation", *The Numerical Method of Lines: Integration of Partial Differential Equations*, pp. 70-75.
Schiesser (1991) "Spatial Differentiation", *The Numerical Method of Lines: Integration of Partial Differential Equations*, pp. p97-p122.
Simonyan, K. (2015) "Very Deep Convolutional Networks for Large-Scale Image Recognition," *ICLR 2015 Conference Paper*, pp. 1-15.
T. Smith (2017) "Geobody interpretation through multiattribute surveys, natural clusters and machine learning", *SEG International Exposition and 87th Annual Meeting*, pp. 2153-2157.
Srivastava et al. (2014) "Dropout: A simple way to prevent neural networks from overfitting", *Journal of Machine Learning Research*, vol. 15, pp. 1929-1958.
Tarantola (2005) "Inverse problem theory and methods for model parameter estimation: Chapters The Least-Squares Criterion", *SIAM* pp. 57-64.
Tschannen et al. (2017) "Facies classification from well logs using an inception convolutional network" XP080767099.
Vineux et al. (2009) "An overview of full-waveform inversion in exploration geophysics", *Geophysics*, vol. 74, pp. WCC1-WCC26.
Veillard et al. (2018) "Fast 3D Seismic Interpretation with Unsupervised Deep Learning: Application to a Potash Network in the North Sea", *80th EAGE Conference & Exhibition*, pp. 1-5.
Waldeland et al. (2018) "Convolutional neural networks for automated seismic interpretation", *The Leading Edge*, pp. 529-537.
Wang et al. (2008) "Advances in velocity model-building technology for subsalt imaging", *Geophysics*, vol. 73, pp. VE173-VE181.
Yilmaz (2001) "Seismic data analysis: Processing, inversion, and interpretation of seismic data", Investigations in Geophysics, Society of Exploration Geophysicists, pp. 463-476.
Zamir et al. (2018) "Taskonomy: Disentangling Task Transfer Learning", *Proceedings of the IEEE Conference on Computer Vision an Pattern Recognition*, pp. 3712-3722.
Zhang (2008) "Incorporating Geological Conceptual Models and Interpretations into Reservoir Modeling Using Multiple-Point Geostatistics", *Earth Science Frontiers*, vol. 15, pp. 26-35.
Zhang et al. (2016) "Automated Geophysical Feature Detection with Deep Learning," *GPU Technology Conference*, pp. 1-22.
Zhu et al. (2017) "Toward Multimodal Image-to-Image Translation", *31st Conference on Neural Information Processing Systems*, pp. 1-12.
Zou et al. (2004) "Statistical validation of image segmentation quality based on a spatial overlap index", *Academy of Radiology*, vol. 11, pp. 178-189.

* cited by examiner

AUTOMATED SEISMIC INTERPRETATION SYSTEMS AND METHODS FOR CONTINUAL LEARNING AND INFERENCE OF GEOLOGICAL FEATURES

CROSS-REFERENCE TO RELATED APPLICATIONS

This application claims the benefit of U.S. Provisional Application 62/849,574, filed May 17, 2019, entitled "Automated Seismic Interpretation Systems and Methods for Continual Learning and Inference of Geological Features", and U.S. Provisional Application 62/777,941, filed Dec. 11, 2018, entitled "Automated Seismic Interpretation-Guided Inversion" the entirety of which are incorporated by reference herein.

FIELD

This disclosure relates generally to the field of geophysical prospecting and, more particularly, to seismic prospecting for hydrocarbon management and related data processing. Specifically, exemplary embodiments relate to methods and apparatus for improving computational efficiency by using automated seismic interpretation to guide inversion analysis.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important goal of hydrocarbon prospecting is to accurately model subsurface geologic structures. For example, seismic data may be gathered and processed to generate subsurface models that reveal geologic structure. Seismic prospecting is facilitated by acquiring raw seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping (including images of maps, such as 2-D or 3-D images presented on a display) of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, one or more inversion procedures may be utilized to analyze the geophysical data and produce models of rock properties and/or fluid properties. Generally, inversion is a procedure that finds a geophysical parameter model (e.g., a velocity model, in which each unit or cell within the model has associated with it a value indicating velocity with which seismic waves would travel through a portion of the subsurface corresponding to that cell), or a collection of models, which, through simulation of some physical response to those parameters, can reproduce to a chosen degree of fidelity a set of measured data. Inversion may be performed, for example, on seismic data to derive a model of the distribution of elastic-wave velocities within the subsurface of the earth. For example, Full Wavefield Inversion (FWI) simulates seismic waves as induced in the field, and attempts to match the measured seismic response. FWI tends to be a very challenging computational problem because the amount of data to be simulated is large (comprising a full three-dimensional seismic acquisition of a subsurface region), and simulated seismic waves are sensitive to not only a large volume of the earth, but to relatively fine-scale variations in properties within that volume. Therefore, naive parameterization of a subsurface model (e.g., by uniform discretization) may require many volume elements (voxels) of uniform elastic velocities to match simulated data to the observed seismic data.

Seismic interpretation seeks to infer geology (e.g., subsurface structures) from geophysical data, preferably and frequently once that data has been inverted or otherwise transformed into a subsurface model (e.g., the impedance, velocity, or physical properties models noted above, which may take the form of an image of the subsurface). For example, structural interpretation generally involves the interpretation of subsurface horizons, geobodies (e.g., salt anomaly), and/or faults from subsurface models (including, e.g., seismic images). Structural interpretation is currently a laborious process that typically takes months of interpreters' time. As such, structural interpretation is one of the key bottlenecks in the interpretation workflow.

Automated seismic interpretation (ASI) can relieve such bottlenecks. For example, ASI may utilize a machine learning (ML) system with training data, such as data representing a broad set of geophysical and geological environments. The ML system may generate trained models based on the training data. The ML system may then apply the trained models to generate a seismic interpretation of a test dataset and/or infer geologic features therefrom. ML approaches heretofore proposed for seismic interpretation have typically focused on analysis tools to improve the selection of and from alternatives (e.g., deterministic seismic attribute analysis), rather than systems to automate the overall interpretation task. Even with state-of-the-art methods, interpretation tasks remain labor intensive, because existing methods lack an end-to-end system. For example, many interpretation tasks are typically performed by the state-of-the-art methods in two stages detection and grouping: detecting small visual units (e.g., pixel level detection of seismic object) and grouping them into larger structures or object instances (fault, salt, facies instances).

An assumption of a ML model is that the training data and the test dataset are from the same statistical distribution. However, many characteristics of seismic training and test datasets may be different due to disparities in seismic acquisition and processing techniques used to produce the images, disparities in noise (e.g., multiples or swell noise), and/or disparities in geological settings. For example, the quality of seismic images can be affected by seismic acquisition factors such as survey types (e.g., ocean-bottom cable, streamer, or nodal acquisition in marine seismic), azimuthal coverage, data frequency spectrum (e.g., broadband data versus narrowband), and/or spatio-temporal sampling rates. The choice of seismic processing methods can also affect the fidelity of geophysical models, creating various inaccuracies in, e.g., velocity models and images. The geological settings can vary considerably from basin to basin (e.g., salt presence leading to enigmatic structures). When the diversity of training data is limited to a single geological basin, a ML model may have difficulty generalizing to another dataset with different geological structures than those portrayed in the training data. Under current systems and methods, given a new application dataset, an interpreter must manually select from a set of variously trained models (e.g., trained with different training data).

Trained models may be refined and/or retrained based on user feedback. However, given the size of typical datasets, it is impractical to collect user feedback at the pixel level. Moreover, user feedback is typically not shared amongst datasets. A ML system may be sequentially trained on multiple datasets to provide a greater diversity of training data. When a ML system is sequentially trained with multiple datasets, the tasks learned through training with each dataset may be independent. The seismic interpreters then manually correct errors from ML model output independently for each training data set.

Retraining ML systems may be time consuming, complex, and often resulting in unexpected or poor results. For example, the initial training of a ML system on a typical seismic dataset may take on the order of weeks to months. Retraining that follows similar steps to the original training can be expected to take a similar amount of time. While the goal of retraining may be to broaden the knowledgebase of the ML system by learning new interpretation tasks, it is possible that new training data may only reinforce certain geologic features at the cost of defocusing other features.

More efficient equipment and techniques to generate subsurface models would be beneficial.

SUMMARY

One or more embodiments disclosed herein include automated seismic interpretation (ASI) systems and methods for training machine learning (ML) models to learn and/or infer subsurface features for one or more geologic scenarios from seismic images, and for retraining the ML models (e.g., with user feedback). One or more embodiments disclosed herein utilize a hierarchical model repository for organizing learned models with respect to geological systems and/or geophysical characteristics of data. One or more embodiments disclosed herein provide a mechanism for incorporating user feedback into training/retraining to refine the model parameters to learn new interpretation tasks. One or more embodiments disclosed herein provide a mechanism for multiple interpreters to collaborate on the same dataset, each interpreting various regions and/or geological features of a subsurface. One or more embodiments disclosed herein leverage distributed computing resources for efficient data augmentation, training, and inference with seismic datasets.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

DETAILED DESCRIPTION

Figure 1A:
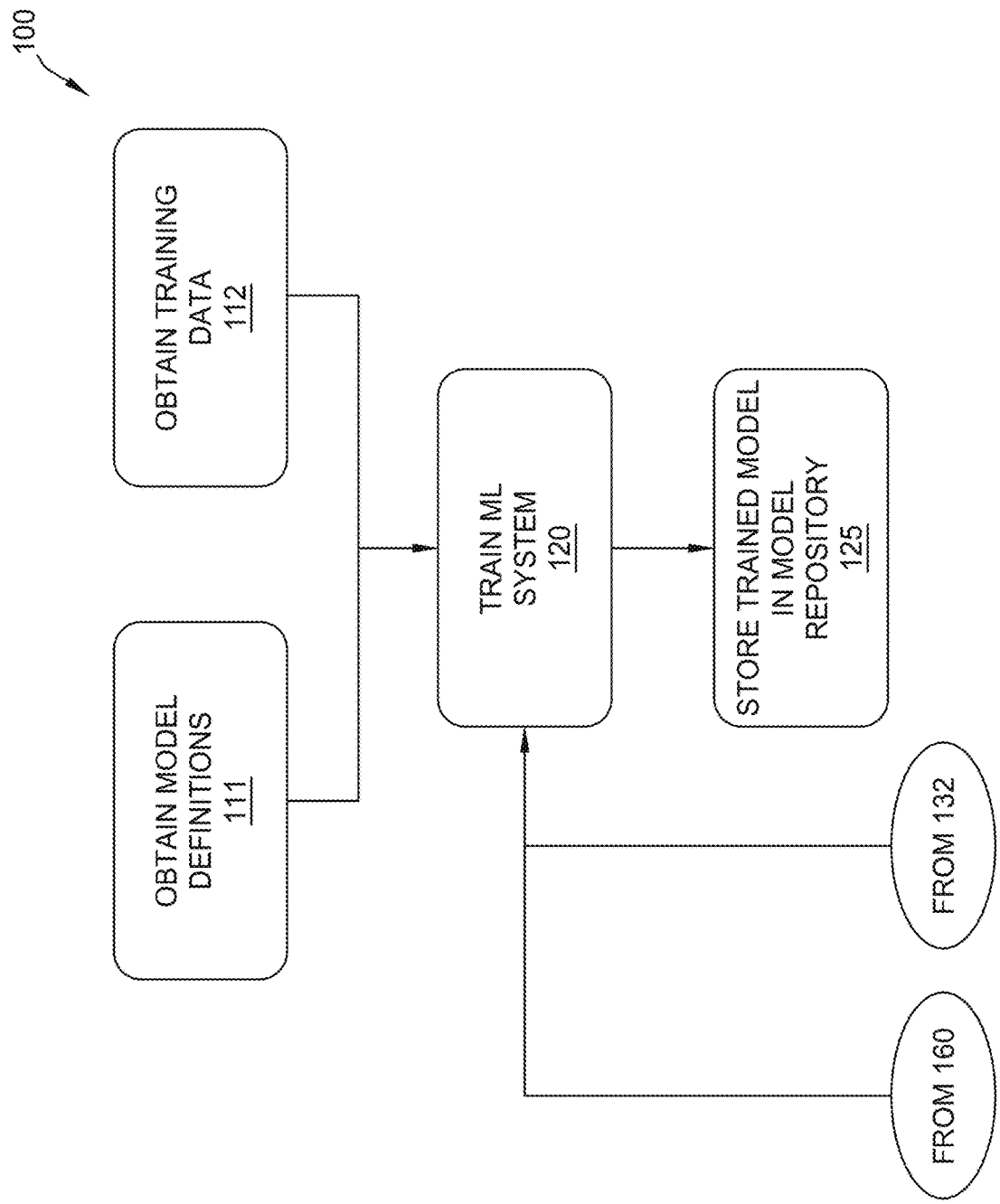
FIG. 1A illustrates a training phase of a method of automated seismic interpretation (ASI).

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data (e.g. seismic image, migration image, reverse-time migration image, pre-stack image, partially-stack image, full-stack image, post-stack image or seismic attribute image) or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

As used herein, inversion in general, and more specifically Full Wavefield Inversion (FWI), refer to geophysical methods which are used to estimate subsurface properties (such as velocity or density). FWI is known to be advanced for its higher resolution and more accurate physics compared to conventional methods. The fundamental components of FWI can be described as follows: using a starting subsurface physical properties model, synthetic seismic data are generated by solving a wave equation (e.g., acoustic or elastic wave equation) using a numerical scheme (e.g., finite-difference, finite-element, etc.). The synthetic seismic data are compared with the field seismic data, and, using the differences between the two, the value of an objective function is calculated. To minimize the objective function, a modified subsurface model is generated which is used to simulate a new set of synthetic seismic data. This new set of synthetic seismic data is compared with the field data to recalculate the value of the objective function. An objective function optimization procedure is iterated by using the newly modified model as the starting model for finding another search direction, which will then be used to perturb the model in order to better explain the observed data. The process continues until a model is found that satisfactorily explains the observed data. A global or local optimization method can be used to minimize the objective function and to modify the subsurface model. Commonly used local objective function optimization methods include, but are not limited to, gradient search, conjugate gradients, quasi-Newton, Gauss-Newton, and Newton's method. Commonly used global methods included, but are not limited to, Monte Carlo or grid search. Inversion may also refer to joint inversion with multiple types of data used in conjunction.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or CO2 is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, a "gather" refers to a display of seismic traces that share an acquisition parameter. For example, a common midpoint gather contains traces having a common midpoint, while a common shot gather contains traces having a common shot.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

The term "real time" generally refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that real time approximates instantaneous action. Real time may also refer to longer time delays that are still short enough to allow timely use of the data to monitor, control, adjust, or otherwise impact subsequent detections of such physical events.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the overall operation. As another example, the two or more events may occur during time periods that overlap by about 40% to about 100% of either period.

The term "label" generally refers to identifications and/or assessments of correct or true outputs provided for a given set of inputs. Labels may be of any of a variety of formats, including text labels, data tags (e.g., binary value tags), pixel attribute adjustments (e.g., color highlighting), n-tuple label (e.g., concatenation and/or array of two or more labels), etc.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that automated seismic interpretation (ASI) systems and methods may be used for training machine learning (ML) models to learn and/or infer subsurface features for one or more geologic scenarios from seismic images (e.g., pre-stack images, partially-stack images, post-stack images, attribute images). ASI may automate structural interpretation, geologic segmentation of seismic images, environment of depositions (EOD) interpretation, delineation of reservoir and/or fluid presence within the reservoir. ASI may provide a significant competitive advantage in being able to assess opportunities faster while considering multiple interpretation and reservoir scenarios. Suitable ASI systems and methods are further described hereinbelow, and also are described in co-pending U.S. application Ser. No. 16/059,567 (U.S. Publication No. 2019/0064378), entitled "Automated Seismic Interpretation Using Fully Convolutional Neural Networks," filed Aug. 9, 2018, which is herein incorporated by reference. Another potential advantage includes saving a significant amount of resources, such as computer space and time. Another potential advantage includes refining multiple ML models with user feedback. Another potential advantage includes leveraging distributed computing resources for efficient data augmentation, training and inference with seismic datasets. Other potential advantages include one or more of the following, among others that will be apparent to the skilled artisan with the benefit of this disclosure: a relational model repository for organizing the trained models with respect to geological system and geophysical characteristics of data; and an ASI end-to-end framework. Embodiments of the present disclosure can thereby be useful in the discovery and/or extraction of hydrocarbons from subsurface formations.

One or more embodiments disclosed herein include ASI systems and methods for training ML models to learn and/or infer subsurface features for one or more geologic scenarios from seismic images, and for retraining the ML models (e.g., with user feedback). One or more embodiments disclosed herein utilize a hierarchical model repository for organizing learned models with respect to geological systems and/or geophysical characteristics of data. One or more embodiments disclosed herein provide a mechanism for incorporating user feedback into training/retraining to refine the model parameters to learn new interpretation tasks. One or more embodiments disclosed herein provide a mechanism for multiple interpreters to collaborate on the same dataset, each interpreting various regions and/or geological features of a subsurface. One or more embodiments disclosed herein leverage distributed computing resources for efficient data augmentation, training, and inference with seismic datasets.

Embodiments disclosed herein may provide an end-to-end ASI ML system (e.g., generate seismic image, estimate geologic features, interpret horizons, produce feature probability maps, extract objects) and may allow single or multi-scenario seismic interpretation and continual retraining of the previously trained models.

Embodiments disclosed herein may provide flexibility in selection amongst various trained models by storing multiple versions of the trained models organized in a geologically and/or geophysically-meaningful relational structure. With such, interpreters may be able to choose a model which is trained in a geologically- or geophysically-appropriate manner for an inference task.

Embodiments disclosed herein may provide refining and/or retraining of the trained models based on user feedback. To reduce the interpreter's effort for examining inference results, the user feedback may be at a feature or object level (high-level representation), instead of at a pixel level (low-level representation). Some embodiments include extraction of one or more geological features from pixel-wise (low-level presentation) predictions (e.g., feature probability map). For example, a high level abstraction of the model inferences may assist the downstream processing methods (e.g., fault-constrained horizon mapping).

Embodiments disclosed herein may provide systems and methods for capturing an interpreter's domain knowledge in a digital form (e.g., training a ML model). In some embodiments, seismic interpreters may manually provide feedback (e.g., correct errors) from ML model output. In some embodiments, the feedback may be used for fine-tuning the ML model to obtain a retrained model that is more accurate for a particular geological interpretation task without overwriting previously-learned tasks. In some embodiments, the feedback/fine-tuning may be iterated until a ML model is trained satisfactorily. This may be particularly beneficial for interpretation tasks that are geologically common across the datasets (e.g., the same type of faults), but that have different geophysical expression in the datasets. Some embodiments utilize a connectivity graph (e.g., a tree structure) to represent relationships between the inference tasks of the same geological concepts. Some embodiments provide data-driven learning methods and geological concepts to build such connectivity graphs.

Embodiments disclosed herein may provide for more efficient and/or more effective retraining procedures. In some embodiments, retraining may only involve a fraction of the time that the original training entailed (e.g., retraining on the order of hours or days, rather than weeks or months). In some embodiments, retraining broadens the knowledge-base of the ML system without sacrificing previously-learned geologic features.

Figure 1B:
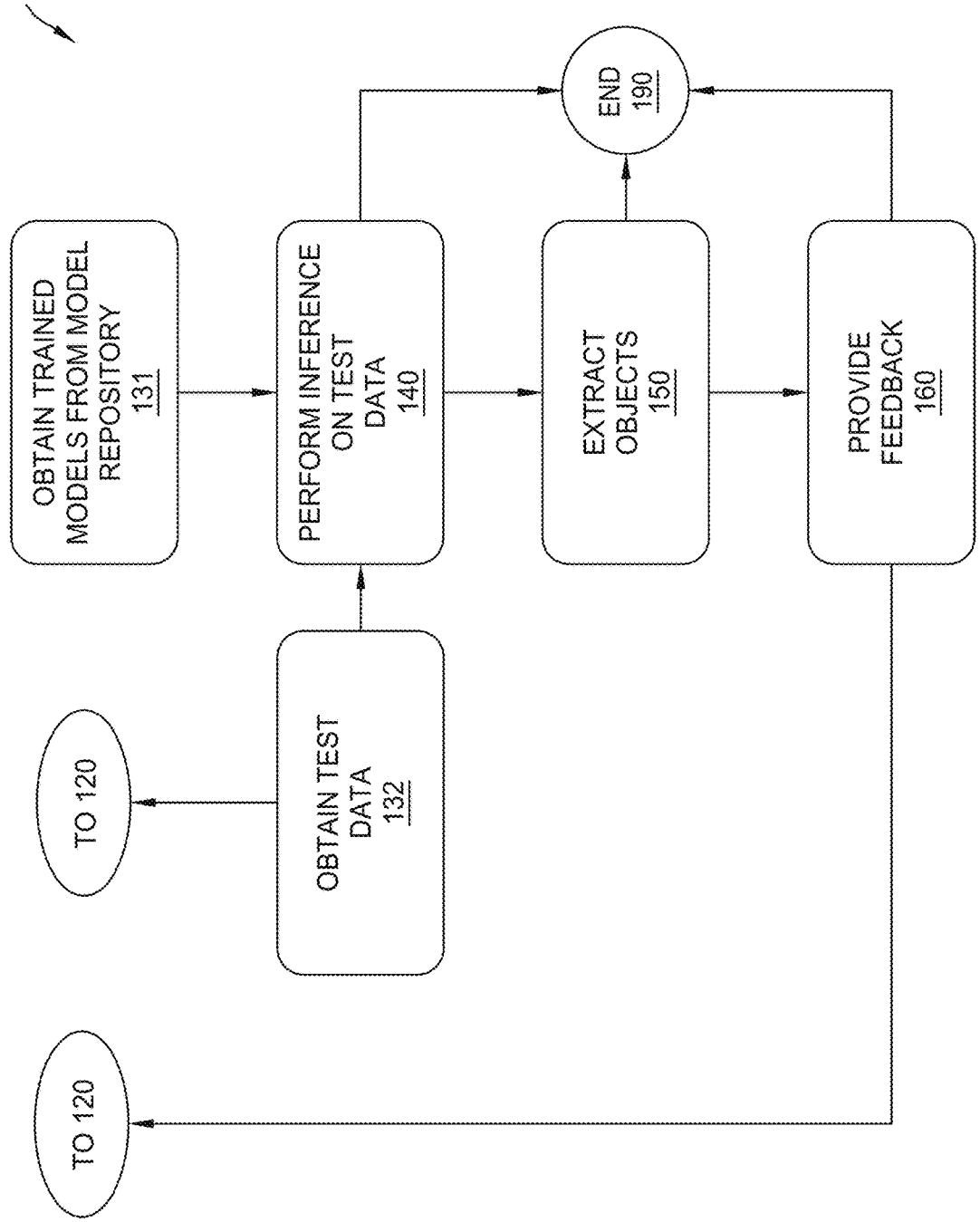
FIG. 1B illustrates an inference phase of the method of ASI.

FIGS. 1A-1B illustrate a method 100 of ASI that may be implemented on one or more seismic data analysis systems. The method 100 has two main phases: training (FIG. 1A) and inference (FIG. 1B). Method 100 begins by obtaining model definitions at block 111 and by obtaining training data at block 112. The actions of blocks 111 and 112 may occur in parallel, sequentially, and/or in any order. The model definitions (sometimes referred to as "training parameters" or "hyperparameters") may include architectures of ML models (e.g., deep learning model, neural network, convolutional neural network), parameters defining those architectures (e.g., number of layers, number of filters in each layers, filter sizes, activation functions), and/or optimization parameters for use with those architectures (e.g., learning rates, optimization parameters, loss function for training). For example, a model definition could be based on a fully-convolutional U-net architecture. In some embodiments, a seismic survey may be conducted to acquire the initial and/or subsequent training data (noting that these and other embodiments may also or instead include obtaining other geophysical data in addition to, or instead of, seismic data—such as obtaining electrical resistivity measurements). In these and other embodiments, simulation models may be utilized to generate synthetic initial and/or subsequent training data (e.g., computer simulation). In some embodiments, the initial and/or subsequent training data may be obtained from a library of data from previous seismic surveys or previous computer simulations. In some embodiments, a combination of any two or more of these methods may be utilized to generate the initial and/or subsequent training data.

Method 100 continues at block 120 where a ML system is trained based on at least some of the model definitions (from block 111) and at least some of the training data (from block 112). For example, during training, a model may be selected, and its parameters may be optimized to fit labeled information in training data (e.g., seismic images). Suitable ML system training systems and methods are further described hereinbelow, and also are described in co-pending U.S. application Ser. No. 16/059,567 (U.S. Publication No.

2019/0064378), entitled "Automated Seismic Interpretation Using Fully Convolutional Neural Networks," filed Aug. 9, 2018, which is herein incorporated by reference. Based on the model definitions (from block 111) and the training data (from block 112), training the ML system at block 120 results in one or more trained models.

Method 100 continues at block 125 where the trained models are stored in a model repository. The model repository may be a relational model repository. The model repository may have a hierarchical structure. For example, a trained model may be stored in the model repository as a node in a tree structure. Model repositories and methods for storing trained models therein are further discussed below.

The second phase (inference) of method 100 is illustrated in FIG. 1B. Method 100 continues by obtaining trained models at block 131 and by obtaining test data at block 132. The actions of blocks 131 and 132 may occur in parallel, sequentially, and/or in any order. In some embodiments, one or more trained models may be selected from the model repository (of block 125). In some embodiments, a seismic survey may be conducted to acquire the initial and/or subsequent test data (noting that these and other embodiments may also or instead include obtaining other geophysical data in addition to, or instead of, seismic data—such as obtaining electrical resistivity measurements). In these and other embodiments, models may be utilized to generate synthetic initial and/or subsequent test data (e.g., computer simulation). In some embodiments, the initial and/or subsequent test data may be obtained from a library of data from previous seismic surveys, previous manual or automated seismic interpretations, or previous computer simulations. In some embodiments, a combination of any two or more of these methods may be utilized to generate the initial and/or subsequent test data.

Method 100 continues at block 140 where an inference is performed on the test data (from block 132) with the selected trained models (from block 131). For example, the ML system may generate a seismic interpretation of the test data and/or infer geologic features therefrom. In some embodiments, the inference may result in one or more geologic feature probability maps or instances of geologic objects. As will be further discussed below, at times during iterations of portions of method 100, the inference at block 140 may be followed by conclusion of the method 100 at block 190.

ML models typically output pixel-wise probability maps with the same size as the input volume. However, it is often impractical for human interpreters to provide feedback for the probability maps pixel-by-pixel. Thus, method 100 may continue at block 150, where one or more objects may be extracted from the ML model output. For example, the ML system may detect and/or segment-out geologically meaningful features as instances of objects from the pixel-wise probability maps.

Figure 2B:
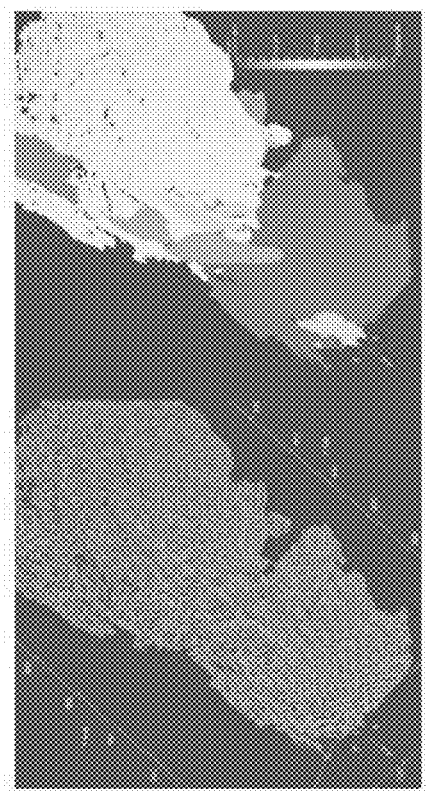
FIG. 2B illustrates extracted fault objects from the point clouds using a Hough transform.
Figure 2A:
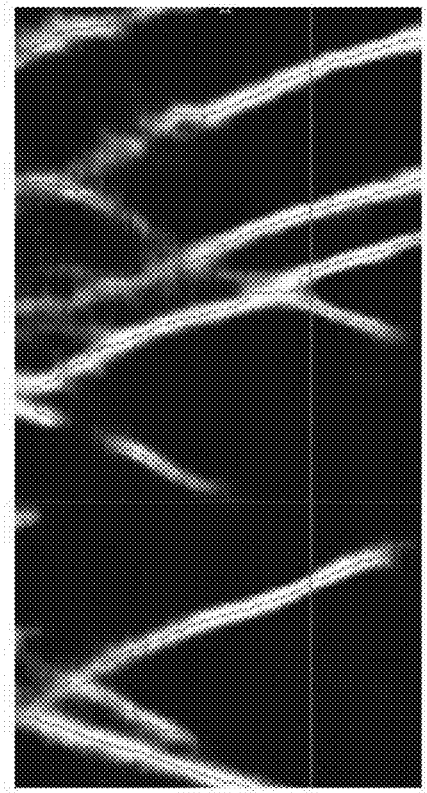
FIG. 2A illustrates a skeletonization of densely-discretized fault probability maps.
Figure 2C:
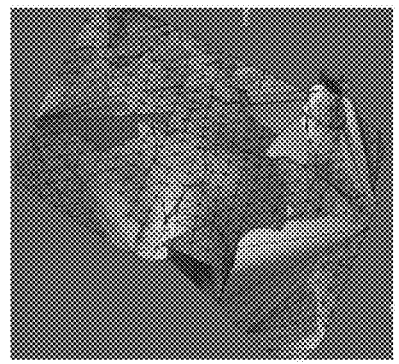
FIG. 2C illustrates a fault surface reconstruction from point clouds using small number of control points.

Specific steps for object extraction (e.g., at block 150) may depend upon the characteristics of the represented geologic structure. For example, a seismic fault may be represented as a 2-dimensional object embedded in a 3-dimensional space. The output of a ML model may be volumetric images, in which the fault objects are tangled with each other with certain thickness. The fault surfaces may be initially extracted as skeletons from the fault probability maps. FIG. 2A illustrates a skeletonization of densely-discretized fault probability maps. The pixels may then be relabeled into disconnected objects with a connected component method. For example, a fault label map may result in a robust surface reconstruction with outliers removed. A Hough transform or a local geometrical method may further separate the fault objects. It should be appreciated that the Hough transform is a globally optimal method that models the fault plane in a parametric form and separates intersecting fault surface into different labels. FIG. 2B illustrates extracted fault objects from the point clouds using Hough transform. To make the fault object easily editable (e.g., for feedback and/or labeling), the fault surfaces may be reconstructed (e.g., resampled) with a small number of points (e.g., control points). For example, the resulting fault surface may use points 100-times less dense than the original pixel-wise representation. FIG. 2C illustrates a fault surface reconstruction from point clouds using a small number of control points. As will be further discussed below, at times during iterations of portions of method 100, the object extraction at block 150 may be followed by conclusion of the method 100 at block 190.

In some embodiments, and/or at times during iterations of portions of method 100, following the inference (at block 140) and/or the object extraction (at block 150), feedback may be provided for the trained model(s), as illustrated at block 160 of FIG. 1B. The feedback may be provided on an object level (e.g., for the objects extracted at block 150), or a control point level and/or a pixel level (e.g., for the output of the inference at block 140). The feedback may improve the trained models. The feedback may be based on the feature probability maps and/or objects or control points extracted therefrom. For example, if an interpreter identifies poor performance of the trained model(s) (e.g., either false negatives or false positives), the interpreter may correct the results by re-labeling the data and/or retraining the model(s) with a re-labeled dataset. The trained models may be retrained with the user feedback (e.g., updated labeling) to either improve previously-learned interpretation tasks or learn new interpretation tasks. For example, method 100 may iteratively retrain the ML system, returning to block 120, until convergence of the feedback at block 160. The ML system may be retrained with additional model definitions (from block 111), additional training data (from block 112 and/or block 132), and/or feedback for existing models (from block 160). The additional model definitions may be new, modified, and/or updated model definitions. For example, additional model definitions may be obtained by updating the parameters of model definitions (or hyperparameters) used in prior trainings and/or retrainings. In some embodiments, and/or at times during iterations of portions of method 100, retraining may utilize only data from the test data (at block 132) in lieu of data from the original training data (at block 112). In some embodiments, the feedback for existing models has the effect of modifying model definitions (e.g., learning rate). Thus the additional model definitions may include modifications of previously-utilized model definitions. In some embodiments, retraining the ML system results in storing additional trained models in the model repository. For example, a tree structure of the model repository may be grown with additional model definitions (from block 111), additional training data (from block 112 and/or block 132), and/or feedback for existing models (from block 160). In some embodiments, retraining the ML system with additional model definitions (from block 111) and/or additional training data (from block 112 and/or block 132) may simply add to the model repository without overwriting prior model definitions or training data (e.g., without editing or deleting previously stored models).

In some embodiments, the ML system of method 100 may be accessed by multiple users (e.g., 10-100 users), sequentially and/or concurrently. For example, an end-user interpreter may have survey data for which feature probability maps are desired. The end-user interpreter may access the ML system by obtaining trained models from the model repository (at block 131). The end-user interpreter may provide geologic parameters relevant to the survey data to the ML system, and the ML system may utilize the structure of the model repository to obtain one or more appropriately trained models. The end-user interpreter may input the survey data into the ML system to obtain test data (at block 132). The ML system may then perform an inference at block 140 with the one or more appropriately trained models and the survey data, resulting in one or more feature probability maps. For the end-user interpreter, the method 100 may then end at block 190.

A training user may also access the ML system of method 100. The training user may be tasked with updating the ML system based on newly-labeled training data. The training user may utilize the newly-labeled training data with the ML system to add to the model repository (e.g., store newly trained models in the model repository at block 125). The training user may also validate the update to the ML system by obtaining trained models (at block 131), obtaining test data (at block 132), and performing an inference (at block 140). The training user may provide feedback (at block 160) by labeling the feature probability maps, either on a pixel level (output from block 140) or on an object level (output from block 150). The training user may retrain the ML system after providing feedback, iterating back to block 120. Once the training user is satisfied that the ML system has learned the newly-labeled training data, the method 100 may end at block 190.

Access of the ML system by the training user may be imperceptible to any other concurrent users of the ML system. In particular, an end-user interpreter may be unaware of training/retraining that may be occurring while he accesses the ML system. Nonetheless, the end-user interpreter may benefit from the most up-to-date models in the model repository. Therefore, the ML system acts as a continual learning system for the benefit of end-user interpreters.

ML System Training

It is often the case that a particular seismic data attribute may be indicative of more than one underlying geologic structure. For example, observed data may be limited and/or noisy, resulting in no single clear and conclusive interpretation. Multi-scenario interpretation presents multiple possible ways of interpreting attributes from seismic data. A multi-scenario interpretation provides alternative interpretations, possibly with quantification of the uncertainty present in each interpretation. In some embodiments disclosed herein, multi-scenario interpretation is used to train the ML system. This differs from typical ML models, which are deterministic when used for learning tasks. Thus, embodiments disclosed herein may generate multiple modalities of output patterns. For example, multiple ML models (e.g., deep learning model, neural network, convolutional neural network) may be utilized to generate multiple modalities of output patterns. As another example, multiple training labels (e.g., feedback from multiple interpreters) may be provided for the same training data to provide multiple plausible interpretation scenarios. In some embodiments, multiple training users may access the ML system concurrently, thereby more quickly providing multiple training labels for the same training data.

In some embodiments, training the ML system at block 120 includes determining model parameters (e.g. filter weights in a convolutional neural network model) by minimizing discrepancies between model-predicted labels and labels in the training data (from block 112). For example, two different systems 220, 320 for training the ML system are presented in FIGS. 3A-3B.

In some embodiments, the model definitions (e.g., training hyperparameters, such as objective function, learning rate, optimization methods, and/or model architectural parameters) may be selected to generate alternative models for multi-scenario interpretation. In some embodiments, additional training data may be generated using data augmentation techniques (e.g., generating additional plausible geophysical and geologic settings). For example, augmentation techniques for seismic images and labels may include scaling, translation, rotation, and/or resizing. In some embodiments, training may utilize parallel computing resources (e.g., having multiple processing units (GPUs and/or CPUs)). Suitable data augmentation systems and methods are further described in U.S. Application Ser. No. 62/826,095, entitled "Data Augmentation for Seismic Interpretation Systems and Methods," filed Mar. 29, 2019, which is herein incorporated by reference. It should be appreciated that utilization of parallel computing resources may advantageously speed up the training and/or data augmentation, especially with large data volumes. In some embodiments, additional training data may be generated asynchronously or in parallel with the training. In some embodiments, multiple models may be trained simultaneously. In some embodiments, the multiple trained models may be combined into an ensemble of models to explore a set of plausible geological scenarios.

Figure 3A:
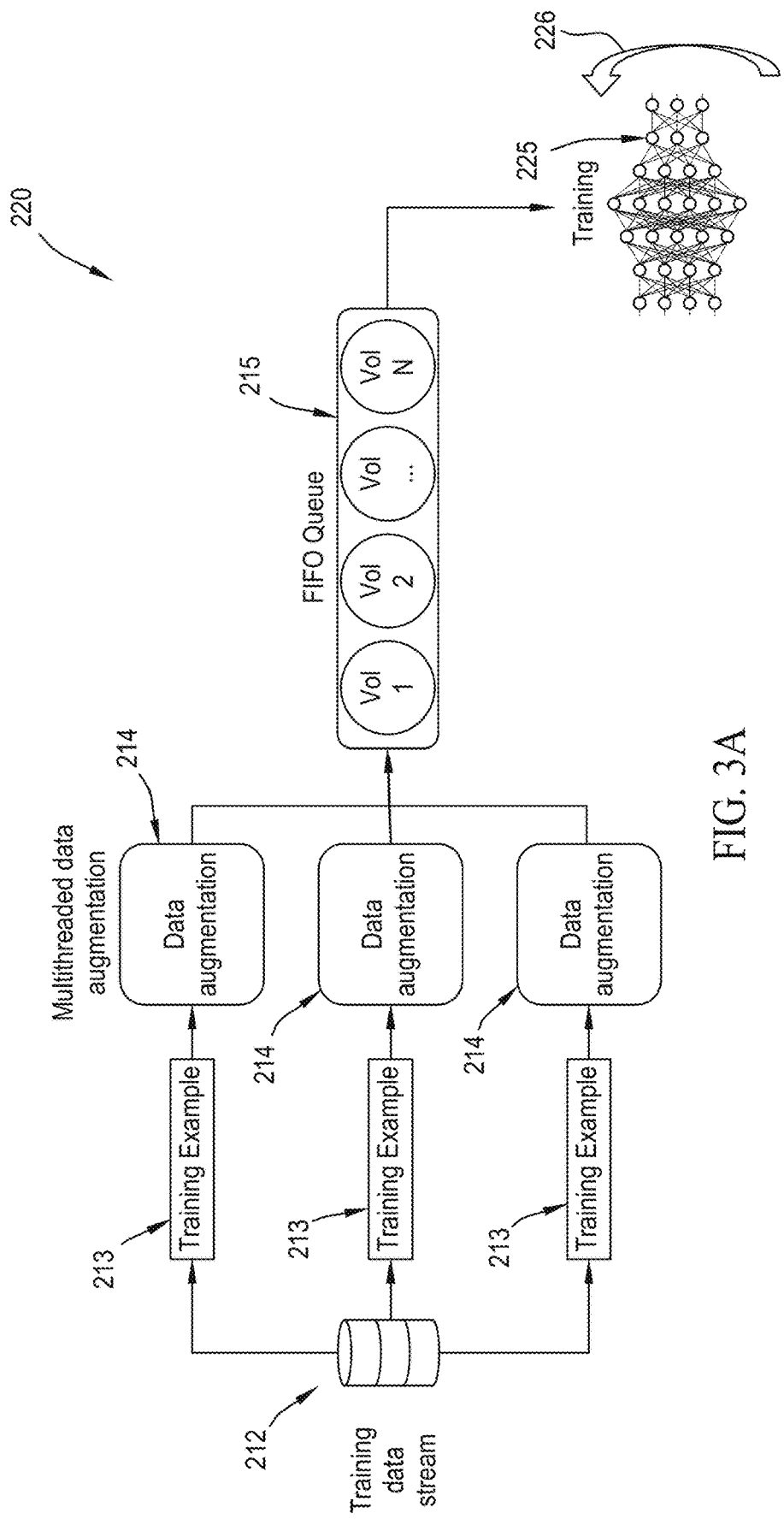
FIG. 3A illustrates an exemplary system for parallel data augmentation and training.

FIG. 3A illustrates a first example system 220 for parallel data augmentation and training. In this example, a training dataset 212 is obtained. In some embodiments, the dataset 212 may be small enough for a single machine's CPU memory. In some embodiments, the dataset 212 may be small enough to fit on a hard disk. In some embodiments, the dataset 212 may be small enough to fit on several (e.g., less than 100) hard disks. Training dataset 212 may include geophysical information, such as seismic images or patches of seismic images. In some embodiments (e.g., utilizing parallel processing, shared-memory systems, and/or distributed-memory parallel processing systems), training dataset 212 may be divided, duplicated, and/or apportioned into (possibly overlapping) data portions 213 along multiple threads. The data portions 213 (e.g., training examples) of the training dataset 212 may be stored in memory locations associated with each thread. Each thread may independently augment the data portions 213 of the training dataset 212 using data augmentation modules 214, each of which is configured to implement a data augmentation routine. For example, separate and distinct processors may perform the data augmentation routine at each data augmentation module 214. Each data augmentation module 214 may generate additional plausible geophysical and geologic settings from its data portion 213 of training dataset 212. In some embodiments, the augmented data is in the form of a subsurface image (e.g., a 3-D model). The multi-threaded augmented data is put into a queue 215 (e.g., a first-in-first-out queue) for training module 225. The training module 225 may implement a training routine that asynchronously reads the augmented training data (e.g., 2-D or 3-D image patches) from the queue 215. For example, apportioning training dataset 212 into data portions 213, running data augmentation routines with data augmentation modules 214, and/or placing augmented data into queue 215 may occur and/or repeat independently of the progress of training module 225. In some embodiments, apportioning training dataset 212 into data portions 213, running data augmentation routines with data augmentation modules 214, and/or placing augmented data into queue 215 may occur and/or repeat unless or until training module 225 completes the training routine.

The training module 225 may read the augmented training data (when available) from the queue 215 and modify model parameters with the augmented training data based on an objective function and an optimization method. This training routine implemented by training module 225 is repeated multiple iterations 226 until the optimization converges (e.g., convergence may be achieved when the changes of a gradient norm of the model parameters is not more 0.1% as compared to starting values). Once the training routine converges, the final model may be stored in a model repository (not shown). System 220 may advantageously maximize the usage of CPU, GPU, and memory on a single machine.

Figure 3B:
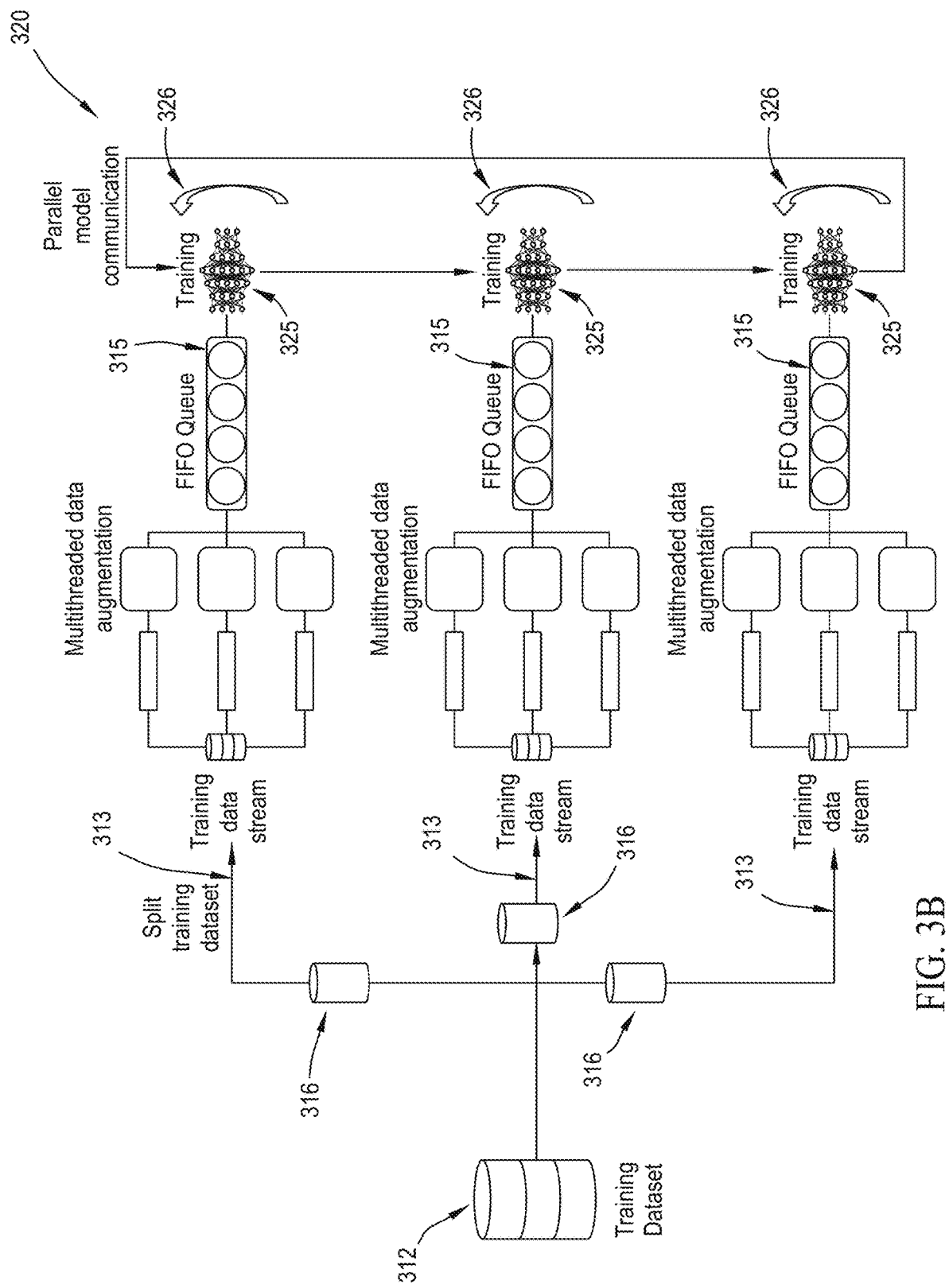
FIG. 3B illustrates another exemplary system for parallel data augmentation and training.

FIG. 3B illustrates a second example system 320 for parallel data augmentation and training. In this example, a training datasuperset 312 is obtained. In some embodiments, the training datasuperset 312 may be larger than training dataset 212. For example, training datasuperset 312 may include multiples of training dataset 212. The training datasuperset 312 may include geophysical information, such as seismic images. System 320 is configured to split the training datasuperset 312 into multiple (possibly overlapping) datasubsets 316. In some embodiments, each datasubset 316 may be sized similarly to training dataset 212. Each datasubset 316 is sent to a separate node 313 possibly containing multiple CPUs and/or GPUs in a distributed or shared computer network. On each node 313, each datasubset 316 serves as training dataset 212 for multi-threaded data augmentation with system 220. On each node 313, augmented data is saved into a respective queue 315 (e.g., a first-in-first-out queue).

A clone 325 of training module 225 is maintained at each node 313. Each clone 325 may asynchronously read the augmented training data (when available) from the respective queue 315 and modify model parameters with the augmented training data based on an objective function and an optimization method. In some embodiments, the parameters of each clone 325 are modified with the optimization program, and the data is stored locally at its node 313. Each clone 325 may repeat the training routine through multiple iterations 226 until the optimization converges (e.g., convergence may be achieved when the changes of a gradient norm of the model parameters is not more 0.1% as compared to starting values). In some embodiments (e.g., after one or multiple gradient updates), the parameters across all nodes 313 are synchronized (e.g., averaged) to the latest state. Once the training of the clone 325 of each node is completed and the parameters are synchronized across nodes, the final model may be stored in a model repository (not shown). System 320 may advantageously maximize the usage of the resources of a distributed system for a training datasuperset 312.

Model Repository

Once a training routine (e.g., training the ML system at block 120, a training routine implemented by training module 225, and a training routine implemented by clone 325) converges, the set of model parameter may be saved for an inference task (e.g., performing an inference on test data at block 140). Typically, ML models assume that the training data and the test data are from the same statistical distribution. However, many characteristics of seismic training and test data may be different due to disparities in seismic acquisition and processing techniques used to produce the images, disparities in noise (e.g., multiples or swell noise), and/or disparities in geological settings. Thus, seismic ML problems are different from other conventional ML tasks, because there may be multiple labeled or unlabeled datasets, and the distribution of these datasets may be different.

In other realms, differences in statistical distributions of training and test data can be accommodated with a model that learns the gap between the two domains. The new data in the new domain is mapped to the original domain where the model is trained. However, due to the large number of possible variations in seismic data, such a domain adaption approach will not typically accommodate differences in statistical distributions of seismic training and test data.

Figure 4:
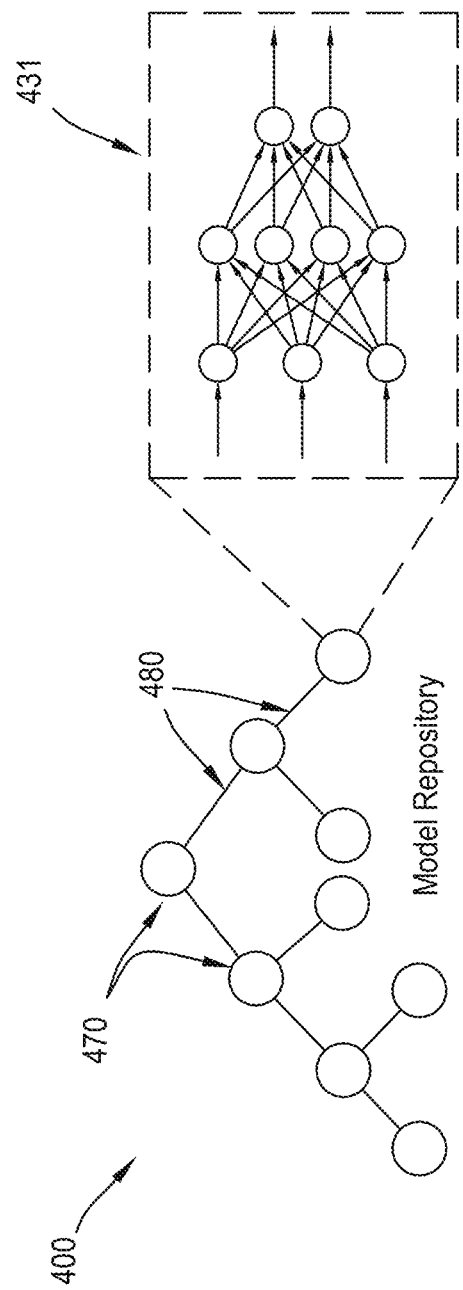
FIG. 4 illustrates an exemplary model repository.

Geologic prior knowledge may be available to connect different types of seismic data. Such geologic prior knowledge may define a hierarchy (e.g., tree structure) for the model repository (e.g., from block 125). FIG. 4 illustrates an example model repository 400. Model repository 400 has a tree structure with nodes 470 and edges 480 between pairs of nodes 470. Each node 470 represents a trained model, such as trained model 431. The edges 480 express the relationship between pairs of nodes: the geologic prior knowledge connecting the trained models at each node in the pair of nodes. A trained model at a node 470 inherits all the properties of its parents up to the root node.

Often, in the process of retraining or continual learning with new datasets, existing ASI models may catastrophically overwrite what was learned from previous trainings in favor of the new dataset, which may misdirect the training. One solution is to start the interpretation model over from scratch and train from the beginning with the original data and the new data together. However, training with both the original data and the new data may dramatically increase the training time and computing resource utilization. Moreover, all prior datasets may not be available during the retraining process. Alternatively, an additional neural network may be utilized to learn the representation of new seismic data and labels. These generative models can create synthetic seismic data that resembles the real data. Thus, during retraining of seismic interpretation models, the generative models can provide additional training samples that resemble the initial training data so that the seismic interpretation model will learn from new data but also not overwrite what was learned previously. The generative models also have applications for data augmentation, as the generated data may offer different but still related views of the original datasets. As another alternative, the ASI parameters (or values thereof) and network connections that are related with the previously learned tasks may be frozen, and the other available parameters (or values thereof) in the model may be adjusted (e.g., remain unfrozen) to learn new interpretation tasks during the training with the new data. As used herein, "freezing" or "frozen" parameters and/or network connections generally refer to constraining, limiting, or restricting change of the parameter (or value thereof) and/or network connection during training. For example, a parameter may be frozen by muting the gradient of the parameter value computed during the training process. In some embodiments, parameters to be frozen during retraining may be determined by a sensitivity analysis of the training and/or validation performance with respect to the parameter or activation frequency of the connections associated with the parameters. Likewise, if the training or validation loss functions are unaffected by the changes of parameter values, then the parameter may be allowed to change (i.e., unfrozen) during the retraining. If there are not sufficient free parameters to learn new tasks, ASI models may be expanded by adding new layers or new filters or new nodes into the existing layers. Whether the number of unfrozen parameters are sufficient for learning new interpretation tasks may be determined by the level of decrease in the retraining loss function at the end of retraining. For example, if the retraining loss function is not decreased below 50% of its starting value, the ASI model may be expanded by adding new filters in each layer. In some embodiments, during training with the new data, only these additional layers, filters, or nodes may be allowed to change. Another approach may be to add regularization to the ASI model parameters which are important for the previously learned tasks to softly constrain the more important ASI model parameters to stay around the same values, while the less important ASI model parameters may be freely adjusted to learn new interpretation tasks.

A model repository having a tree structure, such as model repository 400, encapsulates variations of the training data for each trained model and the various model definitions (e.g., neural network architectures). For example, a node may have multiple children based on the variations in geological system or geophysical system (e.g., survey type, acquisition parameters, processing methods, etc.). When new test data is available for inference, an appropriately trained model may be selected based on the geological or geophysical characteristics of the test data simply by reading the tree. Likewise, reading the tree facilitates storing the trained models for multi-scenario interpretation tasks.

After a seismic interpretation model is trained, the model can be optionally saved into the model repository as a new child node. A generative model that represents the training data used for the seismic interpretation model can be stored alongside as well. The tree of the model repository can grow with the addition of new models. In addition to the trained model parameters, the node may also save meta information about the model, such as the training data, and the ML model with its definition (e.g., deep learning model, neural network, convolutional neural network and their architectures) actually used. All changes to the repository may be logged. When obtaining a trained model from the model repository, a user may select previous instances of the model by reading the tree structure to test a number of geological scenarios.

In practical applications, the present technological advancement may be used in conjunction with a seismic data analysis system (e.g., a high-speed computer) programmed in accordance with the disclosures herein. Preferably, in order to efficiently perform ASI according to various embodiments herein, the seismic data analysis system is a high performance computer (HPC), as known to those skilled in the art. Such high performance computers typically involve clusters of nodes, each node having multiple CPUs and computer memory that allow parallel computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM and/or quantum computers.

As will be appreciated from the above discussion, in certain embodiments of the present approach, expert inputs are elicited that will have the most impact on the efficacy of a learning algorithm employed in the analysis, such as a classification or ranking algorithm, and which may involve eliciting a judgment or evaluation of classification or rank (e.g., right or wrong, good or bad) by the reviewer with respect to a presented query. Such inputs may be incorporated in real time in the analysis of seismic data, either in a distributed or non-distributed computing framework. In certain implementations, queries to elicit such input are generated based on a seismic data set undergoing automated evaluation and the queries are sent to a workstation for an expert to review.

Figure 5:
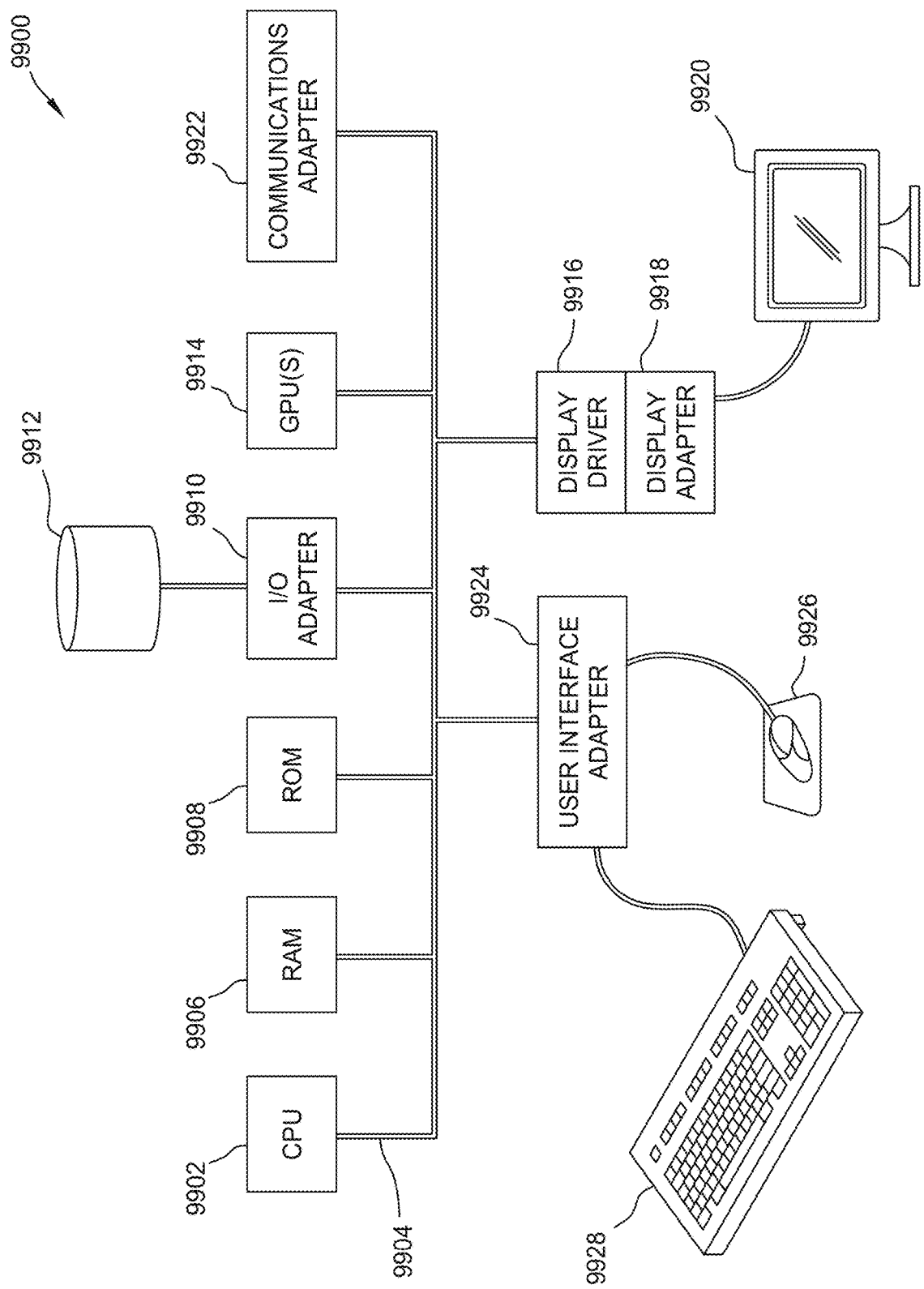
FIG. 5 illustrates a block diagram of a seismic data analysis system.

FIG. 5 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 5, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models and data representations discussed herein (e.g., seismic images, feature probability maps, feature objects, predicted labels of geologic features in seismic data, etc.). As the models themselves are representations of geophysical data, such a display device may also be said more generically to be configured to display graphical representations of a geophysical data set, which geophysical data set may include the models and data representations (including models and representations labeled with features predicted by a trained ML model) discussed herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as deep learning models, neural networks, convolutional neural networks, fully-convolutional U-net architectures, etc. The machine learning architectures may be trained on various training data sets, e.g., as described in connection with various methods herein. The machine learning architectures may be applied to analysis and/or problem solving related to various unanalyzed data sets (e.g., test data such as acquired seismic or other geophysical data, as described herein). It should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The present disclosure includes, in a particular embodiment (Embodiment A), a method for generating an image of a subsurface region, the method including: obtaining a first trained model comprising a geologic scenario from a model repository; obtaining test data comprising geophysical data for the subsurface region; performing an inference on the test data with the first trained model to generate a feature probability map representative of subsurface features; extracting one or more objects from the feature probability map; and generating a feature probability map for the subsurface region from the one or more objects.

Other embodiments may include the method of Embodiment A, further comprising either or both of: (1) displaying an image of the feature probability map; and/or (2) managing hydrocarbons in the subsurface region based on the feature probability map.

The present disclosure also or instead may include in a further embodiment (Embodiment B), a method for generating new data during a retraining process, the method including: training a generative model with training data; and using the trained generative model to generate the new data during the retraining process, wherein the retraining process includes constraints on at least some parameters for an automated seismic interpretation (ASI) model.

The constraints of such methods per Embodiment B for generating new data may include (1) at least one of: freezing parameters related to previously-learned interpretation tasks, and freezing network connections related to previously-learned interpretation tasks. The constraints of such methods may also or instead include (2) adding regularization to the parameters for the ASI model related to previously learned interpretation tasks to penalize change of parameters.

Where constraints include freezing parameters and/or network connections, the method may also include (1a) allowing change of unfrozen parameters of the ASI model to adjust for learning new interpretation tasks during the retraining process. Further, (1b) when the unfrozen parameters are not sufficient for the ASI model to learn new interpretation tasks, such methods may also include modifying the ASI model to provide additional parameters.

In certain embodiments, a method of automated seismic interpretation includes: training a plurality of models by: obtaining first model definitions; obtaining first training data comprising labeled seismic images; training a machine learning system based on the first model definitions and the first training data to generate one or more trained models, each comprising a geologic scenario and executable code; and storing the one or more trained models in a hierarchical structure of a model repository; obtaining a set of trained models from the model repository; obtaining test data comprising geophysical data for a subsurface region; performing an inference on the test data with the set of trained models to generate a feature probability map representative of subsurface features; obtaining feedback for the set of trained models based on the feature probability map; and retraining the machine learning system based on the feedback and at least one of: additional model definitions; and additional training data. The retraining of such methods may comprise generating new training data by: training a generative model with first training data; and generating the additional training data with the trained generative model.

Any or all of the above-described techniques, and/or systems implementing such techniques, can further include hydrocarbon management based at least in part upon the above techniques. For instance, methods according to various embodiments may include managing hydrocarbons based at least in part upon models and data representations (e.g., seismic images, feature probability maps, feature objects, etc.) constructed according to the above-described methods. In particular, such methods may include drilling a well, and/or causing a well to be drilled, based at least in part upon the models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

What is claimed is:

1. A method of automated seismic interpretation, comprising:
   obtaining one or more trained models comprising a geologic scenario from a model repository, wherein the one or more trained models comprise executable code;

obtaining first test data comprising geophysical data for a subsurface region;

performing first inference on the test data with the one or more trained models to generate a feature probability map representative of subsurface features;

obtaining feedback for the one or more trained models based on the feature probability map;

retraining one or more of the trained models based on the feedback;

obtaining second test data comprising geophysical data for the subsurface region; and performing a second inference on the second test data with the retrained one or more trained models.

2. The method of claim 1, wherein obtaining feedback comprises:
   extracting one or more objects from the feature probability map; and
   obtaining labeling of the one or more objects to correspond to the subsurface features.

3. The method of claim 1, further comprising training a plurality of models for the model repository to generate the one or more trained models.

4. The method of claim 3, further comprising, after training one or more of the plurality of models, storing the one or more trained models in a hierarchical structure in the model repository.

5. The method of claim 4, wherein the hierarchical structure is based on a tree structure.

6. The method of claim 3, wherein training the plurality of models comprises:
   obtaining first model definitions;
   obtaining first training data comprising labeled seismic images; and
   training a machine learning system based on the first model definitions and the first training data.

7. The method of claim 6, wherein training the machine learning system comprises optimizing parameters of at least one of the plurality of models to fit the labeled seismic images of the first training data, wherein optimizing parameters comprises changing one or more parameter values.

8. The method of claim 6, further comprising:
   obtaining feedback for the one or more trained models based on the feature probability map; and
   retraining the machine learning system based on the feedback and at least one of:
      additional model definitions; and
      additional training data.

9. The method of claim 8, wherein the additional training data includes at least a portion of the test data.

10. The method of claim 8, wherein the additional training data does not include the first training data.

11. The method of claim 8, wherein performing the first inference on the test data occurs concurrently with retraining the machine learning system.

12. The method of claim 11, wherein performing the first inference is in response to a first user's request, and retraining the plurality of trained models is in response to a second user's request.

13. The method of claim 6, further comprising:
   obtaining at least one of:
      second model definitions; and
      second training data comprising labeled seismic images; and
   retraining the machine learning system based on:
      one of the first model definitions and the second model definitions; and
      one of the first training data and the second training data.

14. The method of claim 1, further comprising:
   retraining the one or more trained models based on the feedback; and
   while retraining:
      training a generative model with training data comprising labeled seismic images; and
      generating new data using the trained generative model.

15. The method of claim 14, wherein the retraining comprises concatenation of labeled test data with the training data.

16. The method of claim 14, wherein the retraining comprises constraints on at least some parameters for an automated seismic interpretation (ASI) model.

17. The method of claim 16, wherein the constraints comprise at least one of:
   freezing parameters related to previously-learned interpretation tasks; and
   freezing network connections related to previously-learned interpretation tasks.

18. The method of claim 17, wherein the retraining comprises allowing change of unfrozen parameters of the ASI model to adjust for learning new interpretation tasks during the retraining.

19. The method of claim 18, wherein the retraining further comprises, when the unfrozen parameters are not sufficient for the ASI model to learn new interpretation tasks, modifying the ASI model to provide additional parameters.

20. The method of claim 16, wherein the constraints include adding regularization to the parameters for the ASI model related to previously-learned interpretation tasks to penalize change of the parameters.

21. The method of claim 1, further comprising managing hydrocarbons in the subsurface region based at least in part upon the feature probability map.

22. A machine learning system, comprising:
   an automated seismic interpretation (ASI) model;
   a training dataset comprising seismic images, wherein the training dataset includes a plurality of data portions;
   a plurality of memory locations, each comprising a replication of the ASI model and a different data portion of the training dataset;
   a plurality of data augmentation modules, each configured to implement a respective data augmentation routine, and each identified with one of the plurality of memory locations;
   a training module configured to implement a training routine, and configured to receive output from the plurality of data augmentation modules; and
   a model repository configured to receive updated models from the training module.

23. The machine learning system of claim 22, wherein each data augmentation module comprises a processing unit.

24. The machine learning system of claim 22, wherein at least two of the plurality of data portions at least partially overlap.

25. The machine learning system of claim 22, wherein the training module is further configured to:
   read augmented training data from the output;
   modify model parameters based on the augmented training data, an objective function, and an optimization method; and
   iteratively repeat reading and modifying until convergence of the objective function.

26. The machine learning system of claim 25, wherein the model repository is configured to receive one of the updated models after the training routine reaches convergence of the objective function, said updated model comprising the modified model parameters.

27. A distributed computer network comprising:
- a training datasuperset comprising seismic images and dividable into a plurality of datasubsets; and
- a plurality of nodes, each comprising an instance of the machine learning system of claim 22, and each identified with one of the plurality of datasubsets, wherein the plurality of nodes share the same model repository.

* * * * *